(12) United States Patent
Sesha et al.

(10) Patent No.: US 12,445,396 B2
(45) Date of Patent: Oct. 14, 2025

(54) COMPUTING NETWORK INFORMATION BASED ON DATA STORE CHANGES

(71) Applicant: HEWLETT PACKARD ENTERPRISE DEVELOPMENT LP, Houston, TX (US)

(72) Inventors: Madhusoodhana Chari Sesha, Bangalore (IN); Krishna Mohan Elluru, Bangalore (IN); Shaun Wakumoto, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 417 days.

(21) Appl. No.: 17/701,289

(22) Filed: Mar. 22, 2022

(65) Prior Publication Data

US 2023/0308401 A1 Sep. 28, 2023

(51) Int. Cl.
*H04L 49/55* (2022.01)
*H04L 49/00* (2022.01)

(52) U.S. Cl.
CPC ........ *H04L 49/555* (2013.01); *H04L 49/3009* (2013.01); *H04L 49/557* (2013.01)

(58) Field of Classification Search
CPC . H04L 49/555; H04L 49/3009; H04L 49/557; H04L 41/0631; H04L 43/0823; H04L 43/50; G06F 16/25; G06F 16/215; G06F 16/23

See application file for complete search history.

(56) References Cited

U.S. PATENT DOCUMENTS

| | | | | |
|---|---|---|---|---|
| 10,459,827 | B1 * | 10/2019 | Aghdaie | G06F 11/0766 |
| 11,902,309 | B1 * | 2/2024 | Nagarajan | H04L 43/0805 |
| 2012/0166617 | A1 * | 6/2012 | Chang | H04W 76/10 |
| | | | | 709/224 |
| 2017/0323247 | A1 * | 11/2017 | Tran | G06Q 10/067 |
| 2018/0091327 | A1 * | 3/2018 | McLaughlin | H04L 12/2823 |
| 2019/0228296 | A1 * | 7/2019 | Gefen | G06N 7/01 |
| 2020/0065212 | A1 * | 2/2020 | Chanda | H04L 41/142 |
| 2021/0073097 | A1 * | 3/2021 | Upadhyay | G06F 11/0757 |

\* cited by examiner

*Primary Examiner* — Ricky Q Ngo
*Assistant Examiner* — Kabir U Jahangir
(74) *Attorney, Agent, or Firm* — Dickinson Wright

(57) ABSTRACT

Systems and methods are provided for collecting data related to changes to a data store table, which may be used for analyzing problems that occur in the network. The information monitored may include types of changes made to a data store/table, such as insertions and deletions of data store elements. When an anomaly occurs in the statistical data store/table data, an alert is issued. This statistical data of the types of changes to a data store may be suggestive of similar changes in a network. For example, the uptime, inactive time, and stable time of rows of a data store table may be used for estimating or inferring the uptime, inactive time, and stable time for nodes, data paths, or other elements of a network. The system may include a web UI or a command line interface, which may aid in diagnosing problems in the network, and taking corrective action.

20 Claims, 9 Drawing Sheets

COMPUTING NETWORK INFORMATION BASED ON DATA STORE CHANGES

BACKGROUND

A data store may refer to a repository for storing and managing collections of data. Examples of data stores include databases, routing tables, storage files, etc. A data store may be comprised of constitute elements (i.e. data store elements). Examples of database elements may include table elements (i.e. elements within or associated with a data table). Examples of table elements may include rows, columns, lists, indexes of tables, database tables, etc.

An Open vSwitch Database (OVSDB) may refer to a network-accessible database. In certain networks, an OVSDB functions as the primary repository for network-related data.

A Time Series Database (TSDB) may refer to a database which stores data associated with network events in a time series manner. TSDBs, and the time series database data (TSDBD) within them, are often derived from network-related data stored in a network's OVSDB.

Network analysis components (NACs) such as HPE's Aruba Network Analytics Engine (NAE) can provide network operators with distributed analytics for troubleshooting and resolution of network-impacting issues. These NACs may analyze network events to provide visibility into outages and anomalies. Existing NACs typically use TSDBD to analyze network events.

BRIEF DESCRIPTION OF THE DRAWINGS

The present disclosure, in accordance with one or more various examples, is described in detail with reference to the following figures. The figures are provided for purposes of illustration only and merely depict typical or example examples.

Figure 1:
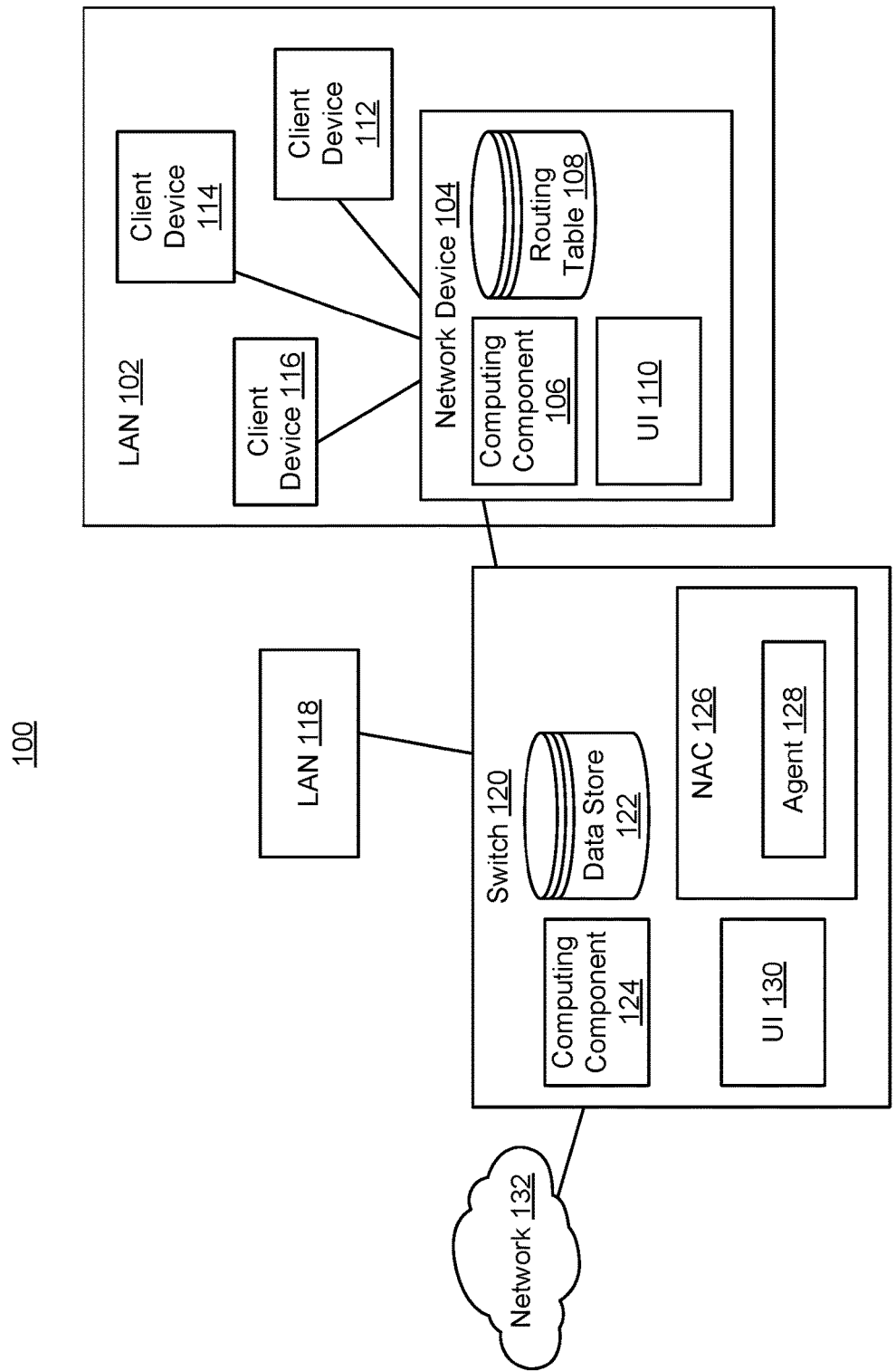
FIG. 1 illustrates an example of a system that includes a computing component that monitors changes in a data store to aid in monitoring a network.

The figures are not exhaustive and do not limit the present disclosure to the precise form disclosed.

DETAILED DESCRIPTION

As described above, existing network analysis components (NACs) rely on time series database data (TSDBD) to analyze network events and report anomalies. This reliance on TSDBD comes at a cost. In particular, the construction and storage of TSDBD can consume large amounts of memory and compute power. Performing analytics on TSDBD consumes even more memory/compute power. Accordingly, it has been difficult to deploy TSDBD-reliant NACs due to the memory/compute power required for their operation.

Against this backdrop, examples of the presently disclosed technology reduce reliance on TSDBD by performing analytics on network-related data closer to its source. In particular, examples investigate changes to a centralized network data store (e.g., a OVSDB) from which TSDBD would normally be derived. By monitoring data related to changes (e.g., insertions and deletions of data store elements) to the centralized network data store, examples may detect anomalies in network function. As examples of the presently disclosed technology appreciate, changes to the centralized network data store may indicate similar changes in the network. Accordingly, when examples detect an anomaly related to changes in the centralized network data store, they may issue an alert or take corrective action.

By performing analytics on the centralized network data store from which TSDBD is typically constructed/sourced, examples may obviate the need for constructing/storing large amounts of TSDBD for network-analytics related purposes. In cutting ties with TSDBD, examples may reduce the amount of memory/compute power required to perform network-related analytics. Utilizing the presently disclosed technology, NACs may reduce their reliance on TSDBD when performing network-related analytics. Accordingly, such NACs may require less memory/compute power for operation, making large-scale deployment more feasible.

Examples of the presently disclosed technology may include an agent that monitors network traffic passing through a network device with which the agent is associated or attached. The activity of the agent may be monitored by storing statistics on table entries to assist an administrator in troubleshooting a process.

In some examples, "data store heuristics" may facilitate monitoring state behavior for a network (as used herein data store heuristics may refer to changes occurring in a data store, and analysis of those changes in order to detect changes in the network). The state of the network may include connections between network devices, paths that are available for sending messages, etc. Example devices and systems may include a command line interface or user interface to assist with debugging the cause of an alert.

Certain examples may collect type I and type II statistics. Type I statistics are statistics that apply to multiple inserts/deletes or other types of changes to a table or database. In other words, type I statistics may be captured across multiple changes (e.g., multiple inserts/deletes). One example of type I statistics is the minimum uptime. The minimum uptime may be the smallest value for the uptime among the rows (or other database elements) being monitored or among a sub-group of the rows being monitored. Another example of type I statistics is a count of the number of updates. The count may be the total number of updates to multiple rows between two events. Type II statistics apply to a window of time. In some cases, type II statistics may be the same as type I statistics except that type II statistics are computed based on a specific window of time, and type I statistics are not. Type II statistics may be useful in comparing a particular time of the day of one day to that of another. Similarly, type II statistics may be used for comparing activities of a particular time of the week (month, season, year, or decade) to the same time of other weeks (months, seasons, years, or decades, respectively).

Examples may capture presence heuristics. Presence heuristics include information related to an element of the database. Presence heuristics are only maintained while a particular element is present or part of the database. Presence heuristics may be information and statistics maintained for the purpose of knowing how well a device or data path associated with a particular row is functioning, for example. As another example, when a network device or data path is down or inactive, the corresponding row may be deleted. Consequently, the information about the row may be deleted because the information about the row may no longer be of interest. Presence heuristics for a row may include values stored in the row, values associated with the row, states of devices or data paths recorded in the row, or counts of items in the row, for example. However, there may be other information about the deleted row that may be maintained or included with aggregate information for tracking the health of the network. For example, column and window information associated with a row may be preserved after the deletion of a row based on an identifier, index value, or a hash value of a specified or uniquely identifiable column or window related to the row.

State behavior monitoring may include an observation window that is used to create a baseline with which to sample statistical behaviors. Deviations from the baseline may be monitored. Some baseline threshold modes that may be used include thresholds configured prior to collecting statistics, which may be based on internal tests. For example, during a route flap the route may change from being available to not being available (or the reverse). If a route flaps more than a threshold number of times in a given time period, an alert may be sent to an administrator, based on internal tests indicating that the route should not be down or inactive more frequently than the threshold. The baselines and thresholds may be adjusted automatically with time, as more data is received.

Examples may capture row, index, and column heuristics. Row, index, and column heuristics may include tracking the latest time of a new insert, update, delete, and other change. The index may include database index fields or a partial index. The row, index, and column data are examples of "observable data." Observable data can be determined by an observation without further computation or inference. Observable events are computed from observable data. "Observable events" may include the uptime, inactive time, and stable time of a row, index, or column. Observable events may include the number of inserts, the number of deletes, the number of updates, the uptime, the stable uptime, and the update frequency. Aggregate heuristics may summarize heuristics of multiple rows, of a partial index, or of virtual routing and forwarding (VRF) tables. The aggregation may start at the time that the monitoring begins and may be continually updated as the monitoring continues or may be aggregated over a shorter period of time. Row heuristics may include presence, window, or aggregate data and events.

Some observable column data may include a value or parameter associated with the column, the latest update value, the latest update to a state stored in the column, or the latest update to the count size of rows or other elements associated with the column. An example of a latest update value is a latest update to the central processor unit (CPU) utilization. Another example of a latest update value is the latest update to a list size associated with the column. For example, the list may be a list of the number of next hops. "Observable measurements" may include comparing a current value with a past value, target value, or statistical value. Statistics may be computed based on all inserts and deletes of columns (or other database changes). Statistics may be performed based on the values in the fields in the column or values associated with the columns.

Statistics may be computed for state changes and the duration of a state. Observable events associated with state changes may include how many updates of the state, the frequency of updates of the state, how many times the state changes between two events, and how many times a list associated with the state is updated. Observable measurements are not necessarily associated with any one event or piece of data. The state of a node or a data path may include whether the node or data path is congested, not currently available, or functioning well, for example. The state of a specific node may include the connections and other nodes to which the specific node is connected. The state of a specific node may include the number of nodes to which the specific node is connected. The state of a node may include the power consumption of the node and a measure of activity of the node. The state of a data path may include the nodes that are part of the data path, the roundtrip time for a message using the data path, and the latency associated with the data path. The state of a database element may include whether the database element is populated, the size of the element, the storage capacity of the element, the activity level of the database element, and whether the element is allowed to be accessed. An update or change to any information associated with the state, may be a change of the state.

Examples may capture table heuristics as well. Table heuristics may include the number of rows in a table that were inserted, modified, updated, or deleted, for example. Table heuristics may include the number of references added to, or deleted from, the table. Some observable measurements for a table are the rate of insertion, the rate of reinsertion, and the rate of deletion of elements within the table. Observable table statistics may be captured across inserts/updates/deletes for a window of time. Observable table statistics may be captured across two or more windows.

Examples may include configurable thresholds to enable administrators to have alerts sent that indicate an anomaly in the data or events compared to a baseline operation of the administrator's network. For example, the user interface may come with a tool for adjusting or customizing a threshold. As another example, an administrator may set an alert for an open shortest path first (OSPF) type route, that is triggered by a metric change that is beyond a value of 10, because the administrator may have determined that large of a deviation to be unusual in that network. Dynamic thresholds may be included to enable systems or administrators to learn from events as the events occur. Dynamic thresholds may be changed automatically or manually. Dynamic thresholds may change in response to an event. The administrator can also set the type of alert to send when a chosen threshold deviation is crossed. One example is the administrator may set a dynamic threshold to cause a high-alert notification to be sent if any border gate protocol (BGP)

route modification occurs. As another example, the administrator may set a dynamic threshold to cause a medium alert to be sent if an OSPF modification occurs. The system may allow the user to choose how much of a deviation from a desired value causes an alert. The administrator may be provided with the capability of querying (polling) to extract heuristics information through a user interface. The administrator may be provided with a user interface for executing a script. Although database elements may be referred to as examples, the methods and systems described herein may be used with a table that stores information related to a network that is not part of a database. The methods may include operations (e.g., executed instructions or instructions).

FIG. 1 shows an example of a system 100 that includes a computing component that monitors changes to database elements to aid in monitoring a network. System 100 may include local area network (LAN) 102. LAN 102 may include network device 104. Network device 104 may be a router or other edge device. Network device 104 may include computing component 106, routing table 108, and UI 110. LAN 102 may also include client devices 112, 114, and 116. Client devices 112, 114, and 116 may be any of a desktop computer, laptop computer, tablet computer, pocket computer, smart phone, or other network enabled device. Client devices 112, 114, and 116 may send and receive messages through edged device 104. For example, network device 104 may be used to support connectivity and communication for client devices 112-116. System 100 may include a LAN 118. LANs 102 and 118 may be connected to switch 120. LANs 102 and 118 are examples of edge networks.

Computing components 106 monitors changes to routing table 108. Information may be computed about events in LAN 102 or system 100, based on the data collected during the monitoring of routing table 108. The data and the information may be analyzed by the computing component 106. When an anomaly is detected by computing component 106, an alert may be sent to an administrator of LAN 102. User interface (UI) 110 may be used, by the administrator of LAN 102, to determine the cause of the anomaly and to take corrective action. UI 110 may be part of computing component 106. LAN 118 may be similar to LAN 102.

Networks often include network switches, which are "edge" devices. Edge devices may provide layer 2 connectivity. Nonetheless, a component may be included for monitoring the changes to a routing table (e.g., of a router), which may be useful to an administrator of a local network, such as network 102, in monitoring issues with network 102 and the connections made with other networks, for example.

Switch 120 may be used to connect LANs 102 and 118 to a server or a wide area network (WAN), such as the Internet or network 132. Switch 120 may include data store 122, computing component 124, NAC 126, agent 128, and UI 130. NAC 126 and agent 128 are optional. Switch 120 can be placed relatively close to LANs 102 and 118 in order to better support communication and connectivity from these LANs to network 132. Data store 122 may be a database or OVSDB. Computing component 124 is similar to computing component 106. Switch 120 is just one example of an edge device in which computing component 124 may be included. Computing components 124 monitors changes to data store 122. Information may be computed about events in the LANs 102 and 118 or the network 132, based on the data collected during the monitoring of data store 122. The data and the information may be analyzed by the computing component 124. When an anomaly is detected by computing component 124, an alert may be sent to an administrator. The tables monitored by computing component 106 or 124, may be routing tables, forwarding tables, or other tables related to a network. The tables monitored by computing component 106 or 124 may store data paths, the cost associated with a data path, and information related to the network devices within the network. For example, the table may store the length of the data path, the number of hops in the data path, or the time required for a message to traverse the data path. Computing component 124 and NAC 126 can be remotely managed, so as to allow a user, such as a network administrator, to adaptively configure functions executed in computing various network analytics associated the network information within data store 122 or switch 120. Switch 120 may be replaced with any edge device.

The "tables" monitored may also include information regarding the device itself (e.g., switch 120). A centralized database (e.g. data store 122) may be used for monitoring everything related to the network, that is observed monitored, tracked, counted, by switch 120 (or another edge device or network device). The heuristics may relate to the functioning of the switch 120 itself.

NAC 126 may be configured to perform centralized network monitoring of LANs 102 and 118 or network 132. NAC 126 may automate network monitoring and troubleshooting. Some of the capabilities of NAC 126 may be supported by access to data store 122. When a problem arises, the agent 128 may provide notifications to pertinent users, such as IT staff. Agent 128 may have access to results of the monitoring performed by computing component 124. Agent 128 may provide results of analysis performed by NAC 126 or computing component 124. Additionally, agent 128 can test for conditions and take actions based on the results of the tests. Agent 128 may send alerts based on the analysis of computing component 126. Computing component 124 may be capable of sending alerts independently of agent 128. UI 130 may be similar to UI 110.

Computing component 106 or 124 may be located outside of network device 104 and switch 120, respectively. In such a case, computing component 106 or 124 may remotely access routing table 108 or data store 122, respectively. Computing component 124 may be able to access or control NAC 126 or agent 128. Computing component 124 may be able cause agent 128 to send alerts. UI 130 may be a web UI. UI 130 may allow an administrator to access and control data store 122, computing component 124, NAC 126, and agent 128. For example, UI 130 may provide access to data collected and analyzed by computing component 124. Optionally, UI 130 may be part of computing component 124.

Figure 2:
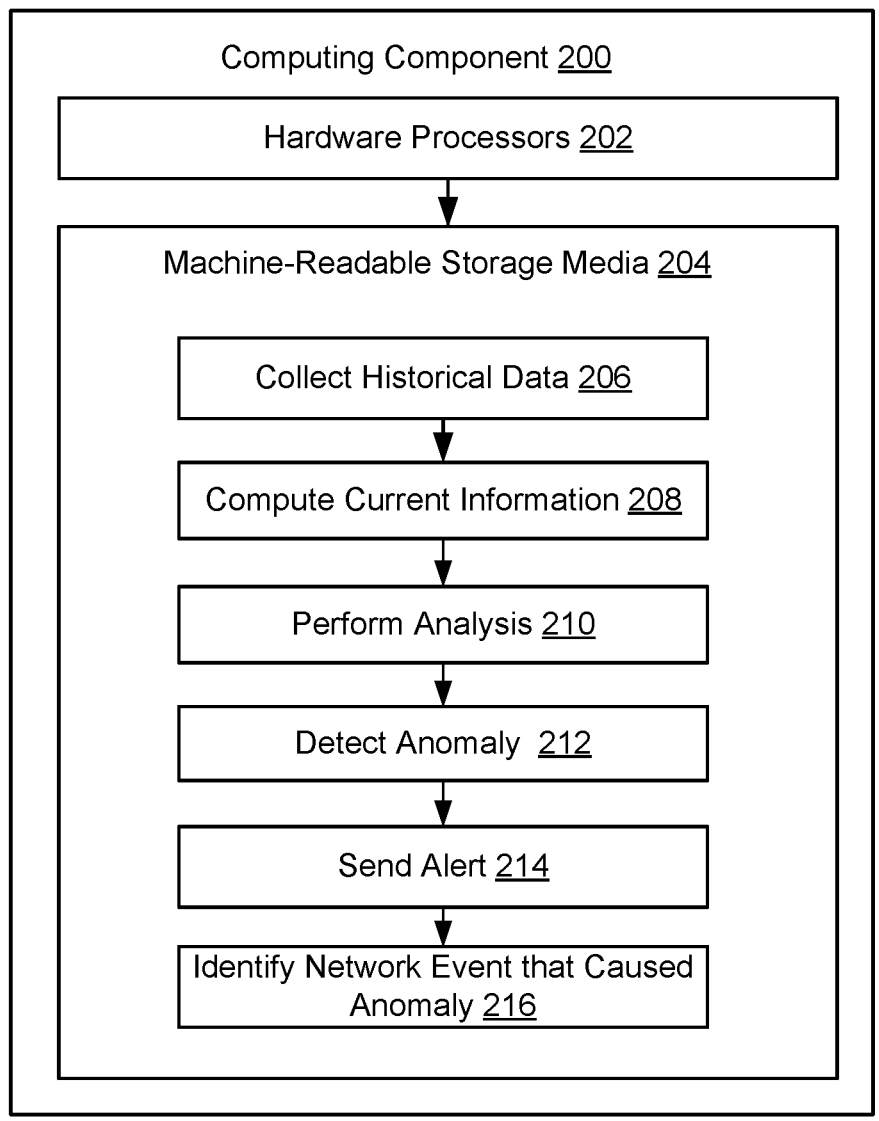
FIG. 2 illustrates an example of a computing component and a process performed by the computing component for monitoring a network by monitoring a data store.

FIG. 2 illustrates computing component 200 and an example process performed by a computing component 200 for monitoring a network. Computing component 200 may be part of a network device, a router, a server computer, a switch, a network manager, a network processing device, or any other similar computing component capable of processing data. In the example implementation of FIG. 2, the computing component 200 includes a hardware processor 202, and machine-readable storage medium 204. Computing component 200 is an example of computing component 106 or 124 of FIG. 1.

Hardware processor 202 may be one or more central processing units (CPUs), semiconductor-based microprocessors, and/or other hardware devices suitable for the retrieval and execution of instructions stored in machine-readable storage medium 204. Hardware processor 202 may fetch, decode, and execute instructions, such as instructions 206-216, to control processes or operations for monitoring a table or database table (or another database element) storing network information. As an alternative, or in addition, to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Machine-readable storage medium 204 may be, for example, random access memory (RAM), non-volatile RAM (NVRAM), an electrically erasable programmable read-only memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with executable instructions, such as instructions 206-216.

Hardware processor 202 may execute instructions 206-216. In some examples, hardware processor 202 may execute an instruction to monitor a table, database table, or database, which may be used for detecting anomalies or diagnosing issues that arise in the operation of network devices or a network. Memory 204 may also store a table or database table, such as routing table 108 or data store 122.

Hardware processor 202 may execute instruction 206 to collect historical data comprising times of data store events and types of data store events or table events by a device (e.g., computing component 200). The data store events or table events may comprise types of changes occurring in a table or a data store table (such as routing table 108 or data store 122) that results from changes in network information. Raw data may be collected/stored and then compared to historical data.

Hardware processor 202 may execute instruction 208 to compute the current information associated with a state of a network device or data path, by the device, based on the historical data. Raw data may be collected/stored and then compared to historical data. Hardware processor 202 may execute instruction 210 to perform an analysis or statistical analysis by the device (e.g., computing component 200). The analysis or statistical analysis may comprise comparing the current information to a defined criterion or to prior information associated with the state of the network device or data path. Hardware processor 202 may execute instruction 212 to detect an anomaly by the device. The anomaly detected may be within the current information. The detection of the anomaly is based on the analysis or statistical analysis (of operation 210). Hardware processor 202 may execute instruction 214 to send an alert, by the device, indicating detection of the anomaly. Hardware processor 202 may execute instruction 216 to identify a network event that caused the anomaly. The identifying of the network event may be provided through a user interface on the device.

Figure 3:
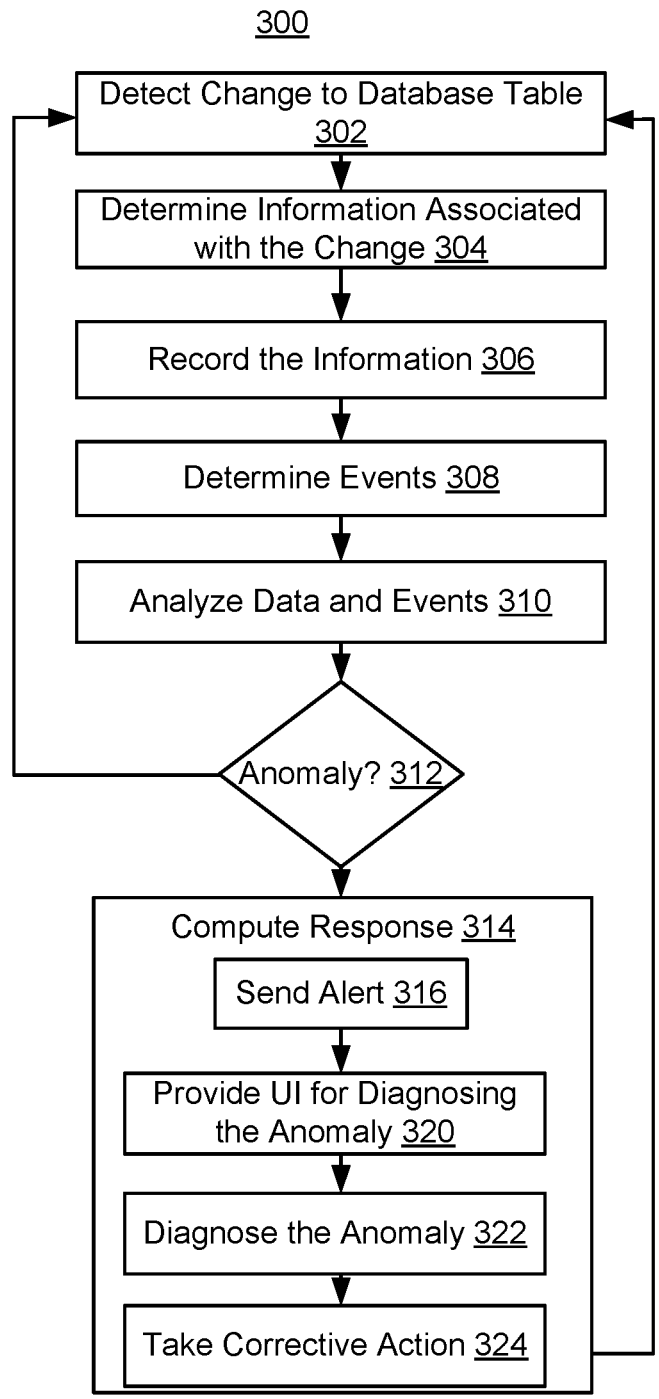
FIG. 3 illustrates an example of process performed by the computing component for monitoring a network by monitoring a data store.

Operations associated with executing instructions 206-216, and alternatives, are further elaborated upon in the discussion of FIG. 3.

FIG. 3 illustrates method 300 as an example process performed by a computing component 200 for monitoring a network.

Operations (e.g., executed instructions) 302-306 may be performed as suboperations of executing instruction 206 to collect historical data. Hardware processor 202 may execute instruction 302 to detect a change to a database element. For example, a message may be received indicating that a node is down or inactive or that a new node is present and in response the database may be updated. The node may be associated with a network device that is down or inactive. The absence of the node may affect the availability of a data path, such as by disrupting the data path. As another example, in operation 302, an external device may access computing component 300 and cause hardware processor 202 to modify the database.

Hardware processor 202 may execute instruction 304 to determine information about the change. For example, the type of change that was made may be determined. In operation 304, the type of change may be a delete, an insert, a reinsert, or an update of a database element, for example. In executing instruction 304, the database element being changed may be determined to be a row, column, index, list, or table, for example. Operation 304 may also involve determining the values stored in the database elements or associated with the database elements that were changed.

Hardware processor 202 may execute instruction 306 to record the change detected when executing instruction 302. For example, historical data comprising times of database events and types of database events may be collected. The database events may comprise types of changes occurring to a database element that result from changes in network information. An example of network information is routing information. The historical data may include the time of the change recorded in association with the type of change or other details of the change.

The execution of instruction 308 may be an example of the computation of the current information of the execution of instruction 208. Hardware processor 202 may execute instruction 308 to determine the occurrence of events. Executing instruction 308 may include observing, inferring, or computing the events that occurred, based on the data recorded during operation 306. For example, executing instruction 308 may compute current information associated with a state of a network device or data path, based on the historical data. In some cases, the change recorded in operation 306 may be in-and-of-itself an event, whereas in other cases the event may need to be computed.

The same event may be associated with multiple types and database elements. For example, a deletion of a row may change the size of multiple columns, lists, and indexes. Also, a deletion of a column may change the number of attributes of many rows. Operation 306 may only detect one or some of the database elements affected by a particular change or only some of the types of changes associated with a given change. Executing instruction 308 may include determining what additional database elements are changed and the type of change that occurred to those additional database elements, based on changes and types of changes detected in operation 306. Alternatively, operation 306 may detect all of the database elements changed and types of changes of interest. A further discussion of the types of events that may need to be computed and how those events may be computed is provided in conjunction with FIG. 5.

Instruction 310 may be executed as part of the analysis performed while executing instruction 210. Hardware processor 202 may execute instruction 310 to analyze the data recorded in operation 306 and the events determined while executing instruction 308 to determine how unusual the data and events are. For example, a statistical analysis may be performed of the data recorded in operation 306 and the events computed while executing instruction 308. The statistical analysis may comprise comparing the current information to prior information associated with the state of the network device. The statistical analysis is discussed further in conjunction with the discussion of FIGS. 5-8. As part of operation 308 and 310, the analysis and statistics computed may be stored in association with a time or timeframe.

The operation caused by executing instruction 312 may be part of the detection performed by the execution of instruction 212. Hardware processor 202 may execute instruction 312 to determine whether the analysis of the execution of instruction 310 indicates the occurrence of an anomaly. The detection of the anomaly may be based on a determination of anomalous data or behavior. For example, as part of executing instruction 312, the anomaly may be detected, based on the statistical analysis or other analysis performed in the execution of instruction 310. Hardware processor 202 may execute instruction 312 to determine whether the detection may involve a value that is different from a mean value or other desired value by more than a specified amount, for example. If that is true, the value may be determined to be anomalous. Similarly, in when executing instruction 312, if a value is greater than a maximum value or less than a minimum value, the value may be determined to be anomalous, for example. The execution of instruction 312 is discussed further in conjunction with FIG. 5.

If in the execution of instruction 312, it is determined that there are no anomalies, the computing component 300 resumes executing instructions 302-310. If in the execution of instruction 312 it is determined that there is an anomaly, then in the execution of instruction 314, computing component 300 computes a response. The response may include any combination of several execution of instructions, which may include any of the suboperations of the execution of instruction 314. Executing the suboperation of instruction 316 may be an example of executing instruction 214. As an example of the execution of instruction 314, the response may include causing hardware processor 202 to issue an alert (in the suboperation associated with the execution of instruction 316). The alert may be sent indicating an anomaly. The alert may be sent to an administrator, so that the administrator can diagnose the problem. The suboperation associated with the execution of instruction 316 may involve causing hardware processor 202 to determine a type of alert to send, based on the specifics of the anomaly. A different message may be sent in the suboperation associated with the execution of instruction 316, depending on the type of alert. The suboperation associated with the execution of instruction 316 may involve determining a severity of an alert (e.g., low level alert, medium level alert, or high-level alert). The suboperation associated with the execution of instruction 316 may involve determining whether user configurable criteria were met for sending an alert.

The suboperations 318 and 320 may be part of executing instruction 216, in which the network event that caused the anomaly is identified. Hardware processor 202 may execute instruction 318 to send the administrator code, or a link, for a user interface for diagnosing the problem. The code may be machine instructions. The code may be for, or the link may be to, UI 110 or 130. For example, the link or code may be sent with the alert or may automatically open in a window of an administrator's interface. The administrator may be able to diagnose the cause of the alert through the user interface. The user interface may provide the administrator with the data and analysis computed and recorded in operations 306-310, for example. The suboperation associated with executing instruction 318 may involve sending links or code, for configuring the criteria that cause an alert to be sent.

Hardware processor 202 may execute instruction 320 to perform a diagnosis of the alert to determine the cause of the anomaly or alert. The suboperation associated with executing instruction 320 may include identifying a network event that caused the anomaly. The identifying of the network event may be through a user interface provided on the device. The suboperation associated with executing instruction 320 may include diagnosing the network or a network element to determine if it is functioning properly. The network element may be a portion of a network, a data path, or a network device. The diagnosis may be based in part on the changes recorded in operation 306, the events computed in the execution of instruction 308, or the analysis of the execution of instruction 310. The diagnosis of the suboperation associated with executing instruction 320 may be performed by an administrator using the user interface of the suboperation associated with executing instruction 318. Alternatively or additionally, the diagnosis may be performed automatically.

Hardware processor 202 may execute instruction 322 to take corrective action. For example, the corrective action may be taken by the administrator through the user interface. Some corrective actions may be performed automatically with no administrator involvement. As an example of a corrective action, a network element may be repaired by the administrator through the user interface. As another example, network data or routing data may be automatically or manually updated to avoid sending messages by a data path that relies on a network element that caused the anomaly.

Not all of the execution of instructions of FIG. 3 are necessary and not all of the details of each operation are necessary. Different combinations of the operations of FIG. 3 may form their own method that may be implemented as part of, or instead of, the method of FIG. 3. Also, different operations may be combined together to form one operation. The operations discussed above in conjunction with FIG. 3 do not require all of the details discussed in conjunction with FIG. 2. For example, in the analysis of operation 310, the statistical analysis performed by executing instruction 210 is only optional and not required. Although the method of FIG. 2 includes execution of instructions 214 (sending an alert) and 216 (identifying the cause of the alert), the corresponding execution of instructions of FIG. 3, execution of instructions 316-320 are optional.

Figure 4:
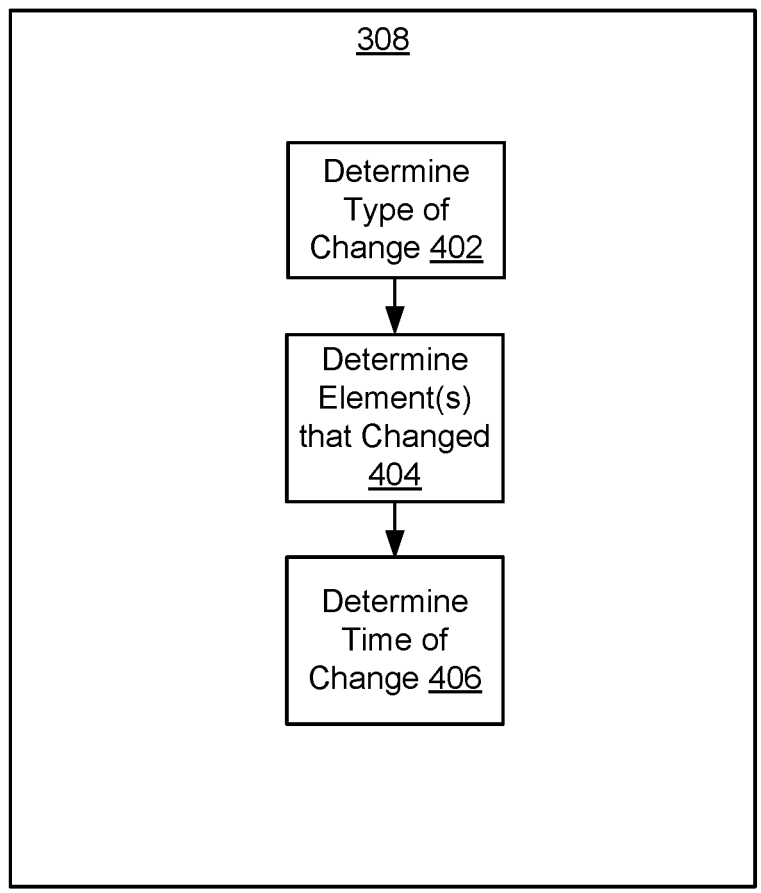
FIG. 4 illustrates an example process performed by the computing component for determining information about a change to a data store.

FIG. 4 illustrates a flowchart of an example of a method (e.g., including the operations or instructions executed) that may be performed as part of executing instruction 304. Hardware processor 202 may execute instruction 402 to determine the type of change that occurred. Executing instruction 402 may include determining whether the change was an insertion, deletion, update, change in a value, change of state, or other change, for example.

Hardware processor 202 may execute instruction 404 to determine the database elements that changed. Executing instruction 404 may involve determining the row that changed, the column that changed, the database element that changed, a list that changed, a database schema that changed, or the index that changed.

The combination of executing instructions 402 and 404 may result in recording a description the change. For example, the combination of executing instructions 402 and 404 may record an indication that the change to the database is a change to an element of a row of the table and the type of change was an insertion.

Hardware processor 202 may execute instruction 406 to determine the time of the change. Instructions 402-404 may be executed in any order or concurrently.

Figure 5:
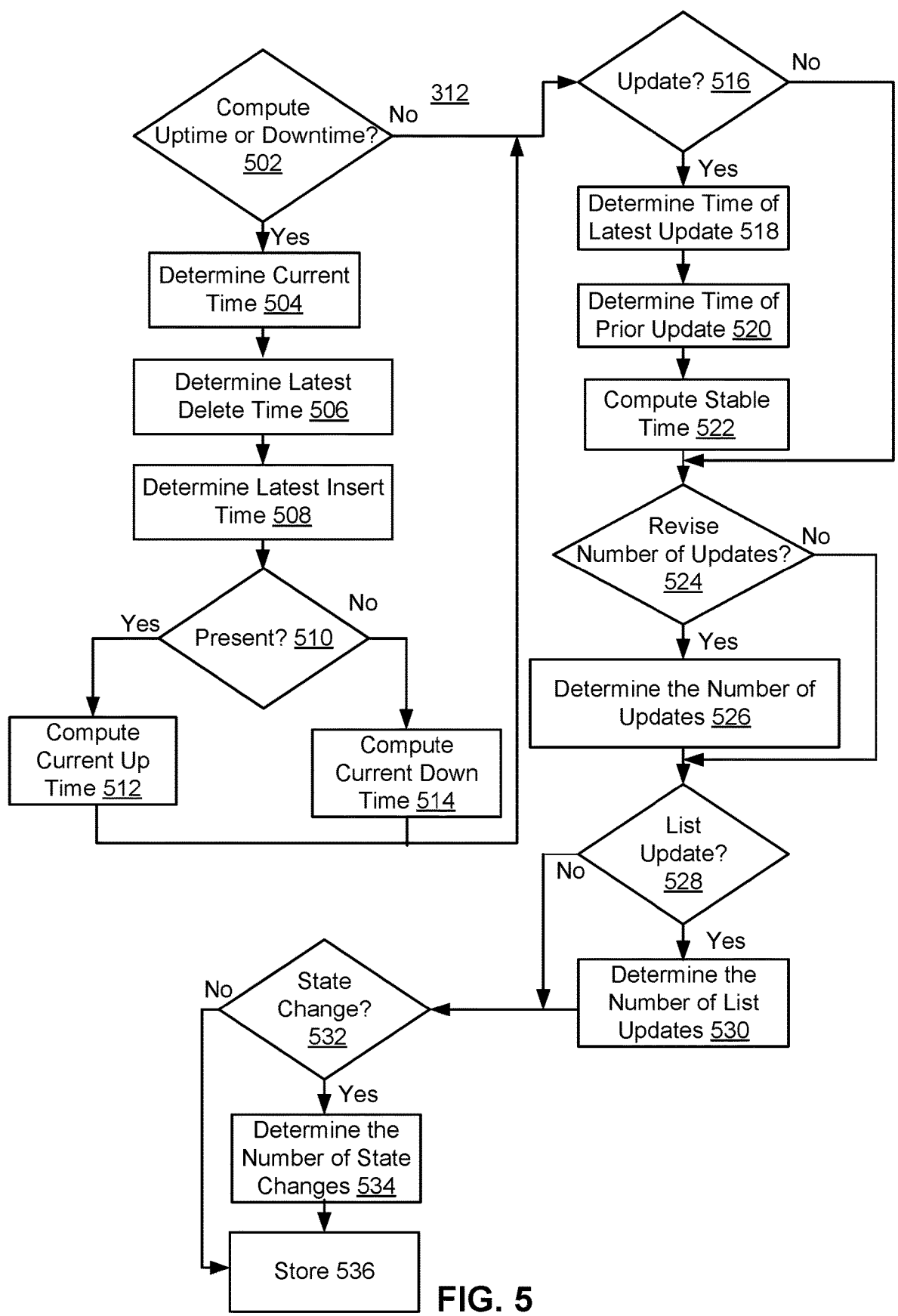
FIG. 5 illustrates an example process performed by the computing component for determining events related to the change in the data store.

FIG. 5 illustrates a flowchart of an example of a method that may be used by computing component 200 or method 300 in executing instruction 308. In the example of FIG. 5, executing instruction 308 may include executing instructions 502-536. The execution of instructions 502-522 may relate to determining events based on the changes caused by operations 302-304. The execution of instructions 524-536 may relate to computing more information about changes that occurred based on the changes recorded during operation 306.

Hardware processor 202 may execute instruction 502 to determine whether to compute an uptime or inactive time. The uptime may be the duration of time that a network component or an element of a data store is up and running (e.g., the lifetime of a data element). The inactive time may be the duration of time that a network component or an element of a data store is inactive and not running (e.g., the time that a data element is not present in a table). The decisions made while executing instructions 502, 516, 524, and 528 may be made based on the passage of a particular interval of time or the occurrence of a particular event, for example. Regarding the execution of instruction 502, it may be desirable to update the uptime or inactive time after an insertion or deletion of a database element. If while executing instruction 502, it is determined to update the uptime or inactive time, the method proceeds to execute at least those of instructions 504-508 that are needed. If while executing instruction 502, it is determined that the uptime and inactive time do not need to be updated, the method proceeds to execute instruction 516.

Hardware processor 202 may execute instruction 504 to determine the current time. Hardware processor 202 may execute instruction 506 to determine the latest delete time of a database element. Hardware processor 202 may execute instruction 508 to determine the latest insert time. Executing instructions 504-508 may involve retrieving the times recorded during the most recent execution of instruction 306 or in the prior executions of instruction 306.

If it is only desired to compute the current uptime for a database element that is currently present, then the execution of instruction 506 may be skipped, because the latest delete time is not needed for computing the current uptime. If it is only desired to compute the current inactive time for a database element that is currently missing, then the execution of instruction 508 may be skipped, because the latest insert time is not needed for computing the current inactive time. If only the stable time is of interest, then the execution of instruction 504 may be skipped, because the current time is not needed for computing the stable time. The stable time is the amount of time that a data store element of network device remains unchanged.

Hardware processor 202 may execute instruction 510 to determine whether a database element is currently present. If the database element is currently present, then the method proceeds to execute instruction 512 for optionally causing hardware processor 202 to compute the current uptime or other values of interest. If the database element is not currently present, then the method optionally proceeds to execute instruction 514, which causes hardware processor to compute the current inactive time or other values of interest. The reason for executing instruction 510 is if the database element is not currently present, then although it may make sense to compute the most recent uptime, it would not make sense to compute the current uptime. Similarly, if the database element is currently present, it would not make sense to compute the current inactive time, but one may still want to compute the most recent inactive time.

Hardware processor 202 may execute instruction 512 to determine the current uptime in accordance with the following: current uptime=current time−latest insert time.

Alternatively or additionally, hardware processor 202 may execute instruction 512 to compute the latest inactive time from: latest inactive time=latest insert time−latest delete time.

Hardware processor 202 may execute instruction 512 to compute the latest prior uptime, from the latest prior uptime=next to latest delete time−prior insert time. For example, hardware processor 202 may execute instruction 512, if the database element is a row, an uptime of a data path or network device may be computed or estimated, based on a current time and an insertion time of a row.

If the device is currently inactive, then the current inactive time may be computed, the execution of instruction 514 may cause hardware processor 202 to compute the current inactive time from: current inactive time=current time−latest delete time.

Alternatively or additionally, executing instruction 514 may cause hardware processor 202 to compute the latest uptime from: latest up time=latest delete time−latest insert time.

Hardware processor 202 may execute instruction 514 to compute the latest prior inactive time from the operation performed when executing instruction 512 to compute the latest inactive time from: latest inactive time=latest insert time−latest delete time. As an example of how the information derived from the execution of instruction 514 may be used, if the database element is a row, the inactive time of a data path or network device may be computed or estimated, based on a deletion time of a row and a subsequent insertion time of the row. After executing instruction 512 or 514, the method proceeds to execute instruction 516.

Hardware processor 202 may execute instruction 516 to determine whether to compute a stable time for a database element. If an update to an element has occurred, there is a new latest stable time, and it may be desirable to compute the stable time. If it is determined to compute the stable time, the method proceeds to execute instruction 518. If it is determined not to compute the stable time, the method proceeds to execute instruction 524. Hardware processor 202 may execute instruction 518 to determine or retrieve the latest update time of a database element. Hardware processor 202 may execute instruction 520 to determine or retrieve the prior update time of the update that occurred just before the latest update. Hardware processor 202 may execute instruction 522 to compute the stable time may be computed from: stable time=latest update time−prior update time.

Optionally, the updates computed by executing instruction 522 may include insertions and deletions of database elements in addition to other types of updates. Alternatively, the updates computed by executing instruction 522 might not include insertions or deletions of database elements. When executing instruction 522, the stable time of a data path or network device may be computed or estimated, based on a latest update time of a row and a next to latest update time of the row.

Hardware processor 202 may execute instruction 524 to determine whether to compute the number of updates between an insertion and a deletion of a row. In one example, if a row has just been deleted, the method may proceed to execute instruction 526. If no rows were deleted, the method may proceed to execute instruction 528. Hardware processor 202 may execute instruction 526 to compute the number of updates between an insertion and deletion of a row (or another database element). The number of state changes may be the number of state changes between two events. If the deletion has not occurred, yet, instruction 526 may still be executed to update (revise) the number of updates on an ongoing basis between the two events. This may be computed by incrementing a previous number of updates counted since the last insertion, by the number of updates that were newly counted. Additionally or alternatively, the number of updates between two other events may be computed.

Hardware processor 202 may execute instruction 528 to determine whether to count the number of state changes of a device or data path. For example, the rows of a table may include a field indicating a state of the device or data path. As another example, the database may include meta data indicating a state of a database element. The computation of the number of state changes may be triggered by the occurrence of an event. For example, if the number of state changes between two events is to be computed, then the occurrence of the second event may trigger computing the number of state changes. Alternatively or additionally, the occurrence of a state change may trigger an update of an ongoing computation of the number of state changes, in general. Hardware processor 202 may execute instruction 530 to increment a previous count of the number of state changes, by the number of states that were newly counted. As an example, executing instruction 530 may include computing a number of changes in state of a database element that occurred between an insertion of the database element and the deletion of the database element. Executing instruction 530 may also include computing a frequency of state changes that occur to a given row, a given group of rows, or another database object.

Hardware processor 202 may execute instruction 532 to determine whether to compute the number of list updates that occurred. The number of list updates may be the number of list updates that occurred in a given column during the lifetime of the column or between two events. If the second of the two other events has occurred, the method may proceed to execute instruction 534. Alternatively or additionally, if a list update occurred, the method may proceed to execute instruction 534. Hardware processor 202 may execute instruction 534 to increment a previous count of the list updates, by the number of list updates that were newly counted. If there is currently no need to compute the number of list updates, the method proceeds to execute instruction 536. Optionally, executing instruction 534 may involve computing the frequency of list updates. Hardware processor 202 may execute instruction 534 to determine the number of list updates that occurred for a column.

The frequency of updates, the number of updates between inserts and deletes, the number of state changes, and the number of list updates may be additional indications of a stability of a network device or a data path. The number of list updates may be an indication of a stability of a portion of the network. Next, hardware processor 202 may execute instruction 536 to store the results of the computations performed while executing of instruction 308.

Instructions 502-536 may be executed for any combination of rows, columns, indexes, and tables of the database. The group of instructions 502-514, the group of instructions 518-522, the group of instructions 524 and 526, the group of instructions 528 and 530, and the group of instructions 532 and 534 may be executed in any order with respect to one another. Each of the above groups of instructions may be executed independently of one another or as separate methods. The execution of any of the above groups of instructions may be skipped. Each of instructions 504-508, 518 and 520 may be executed in any order with respect to one another (or concurrently). The uptime and inactive time of a column may correspond to the availability of a certain type of data or capability of system 100.

Figure 6:
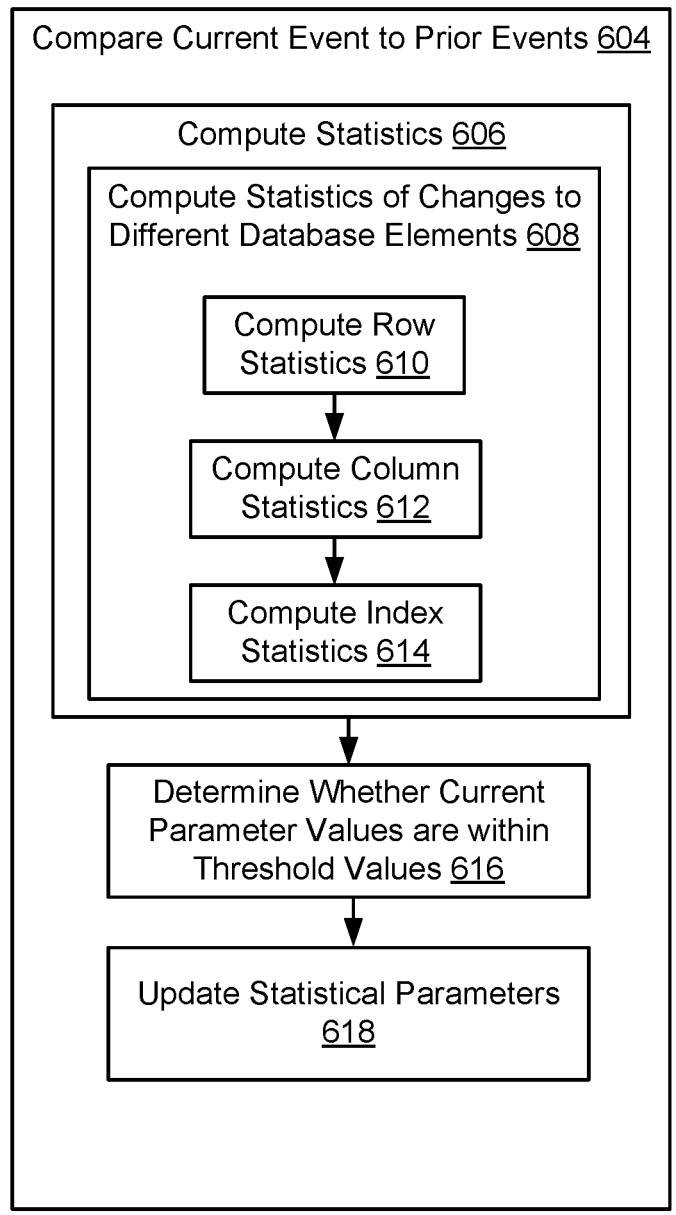
FIG. 6 illustrates an example process performed by the computing component for analyzing data and events related to changes in the data store.

FIG. 6 illustrates an example of a method executed by computing component 200 or method 300 in executing instruction 310. Hardware processor 202 may execute instruction 604 to compare prior events and the events recently observed, measured, or computed. Hardware processor 202 may execute instruction 604 to compare prior data and the data recently observed or computed. The comparison performed while executing instruction 604 may involve a statistical analysis or other forms or comparisons.

Hardware processor 202 may execute instruction 606 to perform a statistical analysis. Executing instruction 606 may include computing statistics of changes that are associated with different database elements. Executing instruction 606 is optional. Executing instruction 608 may include performing a statistical analysis of changes to rows (in the execution of instruction 610), to columns (in the execution of instruction 612), and to indexes (in the execution of instruction 614). Any of the executions of instructions 610-614 may be skipped. As an example of computations that may be included in the statistical analysis, parameters such as the mean value, median value, minimum value, maximum value, and/or standard deviation may be computed. These parameters may be computed for the uptime, inactive time, stable time, or the number of updates during a particular interval of time, for example. Similarly, the mean value, median value, minimum value, maximum value, and standard deviation may be computed for the number of state changes and the number of list updates during a given interval of time. The interval of time over which the statistical analysis is performed may be a fixed amount of time, may be the time between two events, or may be an ongoing computation that is revised as new events occur or new data is received. The fixed amount of time may be a second, a minute, fifteen minutes, a half hour, an hour, a day, or a month, for example. The two events may be an insertion of a database element and a subsequent deletion of the database element, for example.

Hardware processor 202 may execute instruction 616 to compare the statistical parameters to prior computed statistical parameters. While executing instruction 616, a determination may be made as to whether the deviation of current statistical parameters from the prior statistical parameters are within a threshold value of one another.

The threshold may be based on based on the standard deviation. The threshold may be based on a deviation from a target value, mean value, median value, the maximum value, or the minimum value or other parameter computed while executing instruction 614. For example, a determination may be made whether the frequency of updates is within four standard deviations of the mean value frequency of updates. As another example, a determination may be made whether the deviation is more than 1 standard deviation, 1.5 standard deviations, 2 standard deviations, 2.5 standard deviations, 3 standard deviations, 3.5 standard deviations or another amount of standard deviations from the mean, for example. As another example, the threshold value may be a prior maximum value, prior minimum value, a percentage of the prior maximum value, or a percentage of prior minimum value. The percentage of the prior maximum value or prior minimum value may be greater than or less than 100%.

Hardware processor 202 may execute instruction 618 to update the statistical parameters (or other parameters used for the comparison performed while executing instruction 616). As a result of executing instruction 618, the next time instruction 616 is executed, the updated statistical parameters will be used as the prior statistical parameters in performing comparisons.

Alternatively or additionally, Hardware processor 202 may execute instruction 604 to establish the parameters used for thresholds and to compare the prior events to the current event, based on industry standards, theoretical computations, customer expectations, quality of service, or other standards, for example. Instructions 610-614 may be executed in any order with respect to one another, and instructions 616 and 618 may be executed in any order with respect to one another.

Figure 7:
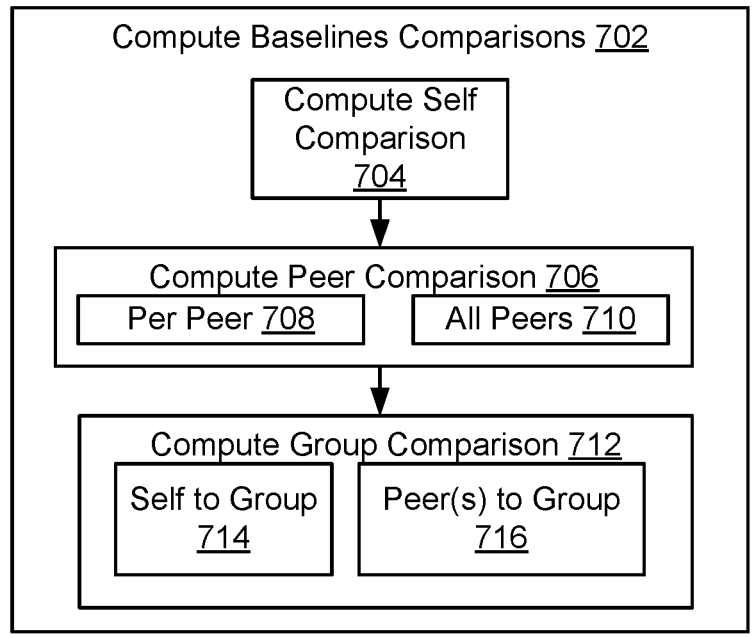
FIG. 7 illustrates an example process performed by the computing component for comparing data and events related to the data store to one another.

FIG. 7 illustrates a further example of a method that may be executed by computing component 200 or method 300 as part of executing of instructions 210, 310, or 604. Hardware processor 202 may execute instruction 702 to establish a baseline value or retrieve a parameter and to compare to current value of that parameter. The baseline to which a parameter is compared, and the acceptable deviation, may be continually updated and may vary with time. The baseline may be based on the value of the parameter for other similar elements or on prior values for the same parameter of the same element, for example. The baseline may include an average value or median value, for example. The deviation from the baseline may involve a standard deviation, maximum or minimum, for example.

Hardware processor 202 may execute instruction 704 to perform a self-comparison in which the prior values are used as a baseline for current values. Hardware processor 202 may execute instruction 704 to compare the parameters of an element to prior values of the parameter for the same element. For example, the mean number of updates to a row during a recent time window may be compared to an average of the mean number of updates of several prior windows. For example, a determination may be made whether the current mean of the most recent window is within 3 standard deviations from the prior mean of the most recent 10 windows. In the execution of instruction 704, the deviation may be based on the prior standard deviation from the prior mean or on the prior maximum or minimum.

Hardware processor 202 may execute instruction 706 to compare a statistical parameter to a baseline based on peers of the same kind. The comparison may be between an element to other peers and may be performed on a per peer basis (in the suboperation associated with the execution of instruction 708) or to all peers (in the suboperation associated with the execution of instruction 710). For example, a given parameter of a given element may be compared by hardware processor 202 to values of that parameter of other elements of the same kind on an element by element basis (the suboperation associated with the execution of instruction 708) or may be compared to an average value of that parameters that is based on all element of the same kind (the suboperation associated with the execution of instruction 710). As another example, the number of changes to a column during a time frame may be compared to the number of changes to other columns during the same time frame to determine if the difference is less than a threshold number of changes, which may be performed on a column by column basis (the suboperation associated with the execution of instruction 708) or the comparison may be to the average number of changes for all columns. As another example, the frequency of updates of a given row may be compared to the frequency of updates of other rows to determine if the two values are within a given threshold difference of one another.

Similarly, hardware processor 202 may execute instruction 712 to compare a statistical parameter to a baseline based on a group of elements. For example, a parameter of a current database element may be compared to the average value of that same parameter computed for a group of database elements (e.g., a group of peers) (in the suboperation associated with the execution of instruction 714) or by comparing the average value of the parameter computed for different groups of peers to that computed for another group of peers (in the suboperation associated with the execution of instruction 716). For example, the parameter may be the frequency of updates to a row, which the suboperation associated with the execution of instruction 714 may cause hardware processor 202 to compare to the average frequency of the updates of a group of rows. As a similar example, the suboperation associated with the execution of instruction 716 may cause hardware processor 202 to compare the average frequency of updates of one group of rows to the average frequency of updates of another group of rows or to the average frequency of all groups of rows. The instructions of FIG. 7 may be executed in any order with respect to one another. Any of the instructions of FIG. 7 may be executed concurrently with respect to one another. The execution of any of the instructions of FIG. 7 may be skipped.

In the execution of instructions 706-712, the deviation may be based on the standard deviation, maximum or minimum of the group to the which a current parameter is compared.

Figure 8:
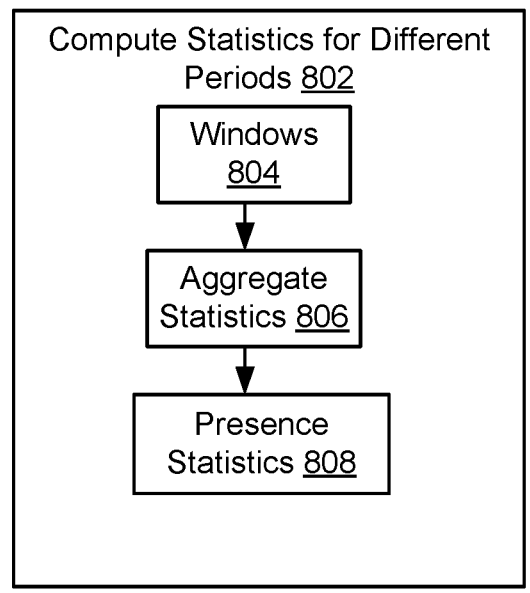
FIG. 8 illustrates an example process performed by the computing component for computing statistics for data and events related to the data store.

FIG. 8 illustrates an example of how any of instructions 610-612 of FIG. 6 may be executed. Hardware processor 202 may execute instruction 802 as part of computing statistics while executing instruction 604 (FIG. 6) or executing of instruction 702 (FIG. 7) for different periods of time. Executing instruction 802 may include computing type I and type II statistics. Hardware processor 202 may execute instruction 804 to compute statistics of different windows of time (type I statistics). Executing instruction 804 may include performing a statistical analysis on multiple windows of data on a per window basis, where each window of data comprises data collected during a different window of time. For example, the comparing associated with executing instruction 804 may comprise comparing a statistical analysis of a first window to statistical analysis of a second window.

Optionally, in executing instruction 804, the first window and the second window may share a common attribute. For example, both windows may be for the same time of day, same time of the week, same time of the month, or same time of the year. For example, statistics may be computed for each hour of each day, so that the statistics of a particular hour on one day may be compared to the statistics of same hour, but on other days. The windows of time may include seasons of the year, months, or days. The windows of time may include groups of seasons, groups of months, groups of days. The windows may include periods of time of length 12 hours, 11 hours, 10 hours, 9 hours, 8 hours, 7 hours, 6 hours, 5 hours, 4 hours, 3 hours, 2 hours, a half hour, or other periods of time. One may expect that the statistics of the same time of day, but for different days may share similar characteristics. Similarly, one may expect the statistics for the same period during a week of different weeks, the same period of a month of different months, same part of a year of different year, or the same season of different years may share common characteristics. For example, the mean of the number of updates to a row between 1:00 am and 2:00 am of different days is likely to be closer to one another than the mean of the number of updates between 1:00 am and 2:00 am of one day is to the mean between 1:00 pm and 2:00 pm of the same day.

Hardware processor 202 may execute instruction 806 to compute aggregate statistics. Aggregate statistics may include computation of a count, total, mean, median, standard deviation, maximum or minimum or any parameter that requires multiple data points to be computed, for example. The aggregate statistics computed while executing instruction 806 may require more data points or a longer length of time than those of the execution of other instructions. For example, executing instruction 806 may require aggregating parameters from multiple windows. Executing instruction 806 may include aggregating parameters from a particular number of the most recent windows. Executing instruction 806 may include aggregating parameters from data and events that occurred after a particular time. Executing instruction 806 may aggregate parameters of the entire time that the computing component 200 or method 300 has been monitoring a given table or database. The parameters of the execution of instruction 806 may be statistical or other parameters that characterize or summarize the data and events of the execution of instruction 206, 208, 302-308 or the parameters of the execution of instruction 604 and 702. Hardware processor 202 may execute instruction 808 to compute presences statistics. Instructions 804-808 of FIG. 8 may be executed in any order with respect to one another. The instructions 804-808 of FIG. 8 may be executed concurrently with respect to one another. The execution of any of the instructions of FIG. 8 may be skipped.

One of ordinary skill in the art would think that to monitor the functioning of a network, one needs to monitor the devices and links that make up the network as opposed to the changes to the database. As such, it would not be obvious to monitor a network by monitoring changes to database tables or other tables storing network or routing information. Additionally, the computing component 200 or method 300 may provide a unique collection of data in one location that is useful in manually or automatically diagnosing or repairing issues with a network. The value of having this unique set of data in one location, in facilitating diagnosis and repair of networks, was not appreciated in prior systems.

Figure 9:
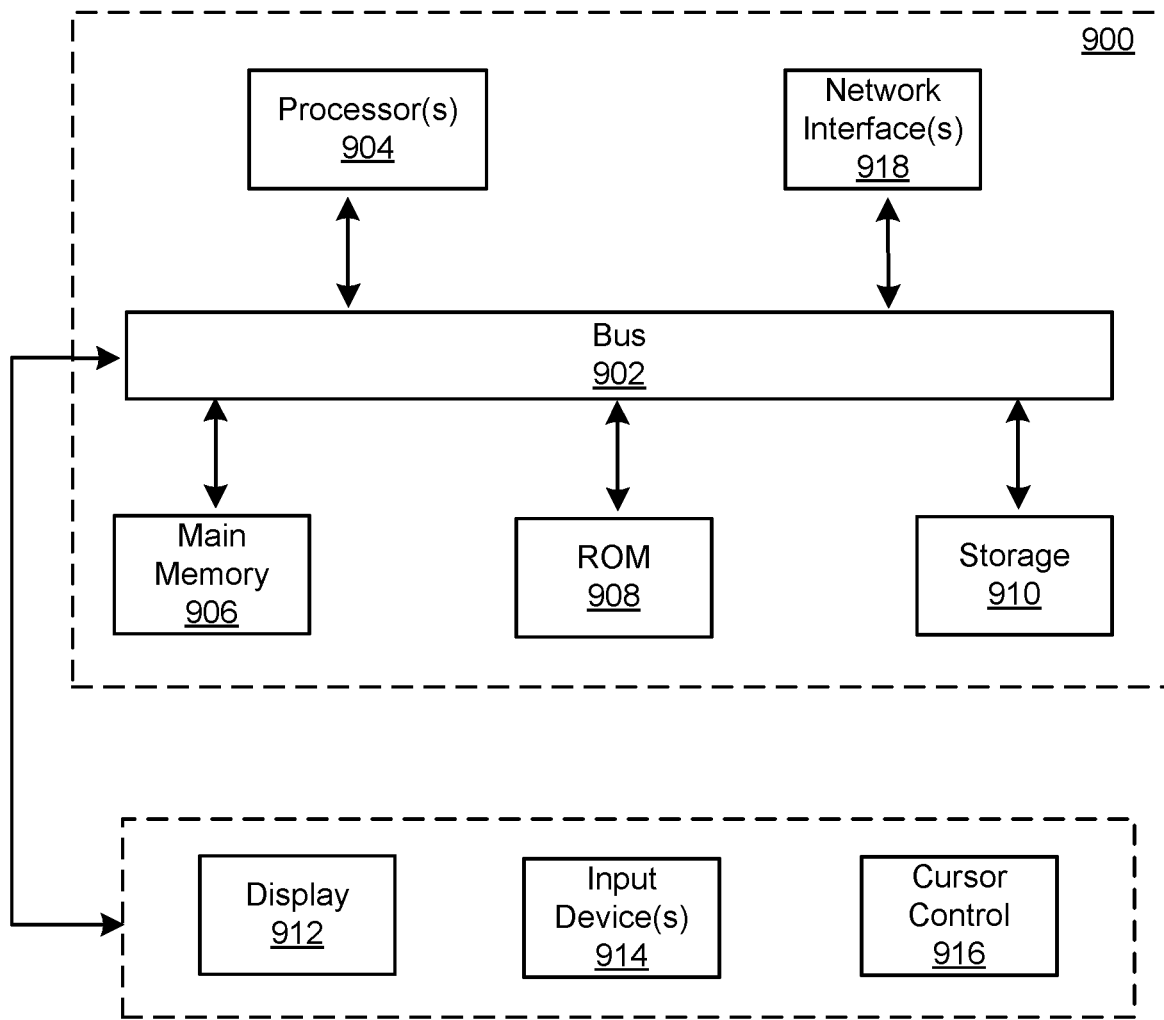
FIG. 9 illustrates an example computing component that may be used to implement various features of examples described in the present disclosure.

FIG. 9 depicts a block diagram of an example computer system 900 in which various of the examples described herein may be implemented. Computing system 900 may include edge device 140 or switch 120. Computing component 200 or method 300 may be part of computer system 900. The computer system 900 includes a bus 902 or other communication mechanism for communicating information, one or more hardware processors 904 coupled with bus 902 for processing information. Hardware processor(s) 904 has a similar description as hardware processor 202 or 302.

The computer system 900 also includes a main memory 906, which has a similar description as machine readable storage 204 or 304. Main memory 906 may be coupled to bus 902 for storing information and instructions to be executed by processor 904. Main memory 906 may store instructions for monitoring changes to a database and sending alerts. Main memory 906 may store routing table 108 and UI 110. Main memory 906 may store data store 122, NAC 126, and UI 130. Main memory 906 may store machine instructions for implementing the methods associated with FIGS. 2-8. Main memory may store data and events characterizing changes to database elements. Main memory may store presence information, window information, aggregate information, and statistical analysis of changes to tables, for example. The computer system 900 may be coupled via bus 902 to a display 912, input device 914, and cursor control 916. Display 912 displays information to a computer user. Input device 914 may include a hardware user interface that communicates information and command selections to processor 904. Cursor control 916 may include a hardware user operated device that communicates direction information and command selections to processor 904 and for controlling cursor movement on display 912. Input device 914 may be used by an administrator to interact with a user interface, or web UI, to analyze the causes of anomalies in the data and events. Network Interface(s) 918 may be used for connecting computer system 900 to one or more networks, such as LANs 102 and 118 and network 132, for sending and receiving messages. Network Interface(s) 918 allow a user to access computer system 900, via UI 110 or 130.

Although databases and database elements are discussed as an example, any data store or data store element may be used. For example, elements of tables that are not associated with a database may be used instead of database elements. The methods and systems described herein also work in systems having a database, file system, or other system of storing data with data elements that are arranged in a manner that does not include tables (or may be used with another data store).

In general, the word "component," "engine," "system," "database," "data store," and the like, as used herein, can refer to logic embodied in hardware or firmware, or to a collection of software instructions, possibly having entry and exit points. Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    based on a change in connections between network devices, determining a number of changes to one or more elements of historical data store data over a time window, the historical data store data comprising times of data store events and types of data store events, the data store events comprising types of changes occurring in a data store table that result from changes in network information, wherein the types of changes comprises one or more of: a row deletion in the data store table responsive to an inactive connection between network devices and a row insertion responsive to an available connection between network devices;
    computing current information associated with the change in connections between network devices based on the number of changes to the one or more elements;

performing a statistical analysis comprising comparing the current information to prior information associated with the connections between network devices;
detecting an anomaly within the current information based on the statistical analysis;
sending an alert indicating detection of the anomaly; and
providing to a user interface, an identification of a network event that caused the anomaly.

2. The method of claim 1, wherein the types of data store events comprises an update of an element of the data store table.

3. The method of claim 1, wherein the types of data store events comprises an insertion of an element of the data store table.

4. The method of claim 1, wherein the types of data store events comprises a deletion of an element of the data store table.

5. The method of claim 1, wherein the changes in the data store table comprises a change to an index of the data store table.

6. The method of claim 1, further comprising computing an uptime of a data path, based on a current time and an insertion time of a row.

7. The method of claim 1, further comprising computing an inactive time of a data path, based on a deletion time of a row and a subsequent insertion time of the row.

8. The method of claim 1, further comprising computing a stable time of a data path, based on a latest update time of a row and a next to latest update time of the row.

9. The method of claim 1, wherein the network devices comprise one or more of: a router and a switch, and wherein the data store table comprises one or more of: a routing table and a forwarding table.

10. The method of claim 1, wherein the time window comprises an amount of time between an insertion of the element of the data store table and a deletion of the element of the data store table.

11. The method of claim 10, wherein the current information includes a parameter comprising one or more of: a mean value, median value, minimum value, maximum value, or frequency of changes computed from the number of changes to the one or more elements determined over the time window, and wherein the method comprises:
computing a deviation of the parameter from the prior information; and
determining that the deviation is more than a threshold value,
wherein the anomaly is detected responsive to the determination that the deviation is more than the threshold value.

12. A computing component comprising:
a hardware processor; and
non-transitory memory storing one or more instructions, which when carried out by the hardware processor cause the hardware processor to:
based on a change in connections between network devices, determine a number of changes to one or more elements of historical data store data over a time window, the historical data store data comprising times of data store events and types of data store events, the data store events comprising types of changes occurring in a data store table that result from changes in the connections between network devices, wherein the types of changes comprises one or more of: a row deletion in the data store table responsive to an inactive connection between network devices and a row insertion responsive to an available connection between network devices;
computing current information associated with the change in connections between network devices based on the number of changes to the one or more elements;
perform a statistical analysis comprising comparing the current information to prior information associated with the connections between the network devices;
detect an anomaly within the current information based on the comparing of the current information to the prior information;
send an alert indicating detection of the anomaly; and
provide to a user interface, an identification of a network event that caused the anomaly.

13. The computing component of claim 12, wherein the one or more instructions further cause the hardware processor to:
upon insertion of a row, collect information about the row; and
upon deletion of the row, discard the information collected about the row.

14. The computing component of claim 12, wherein:
the statistical analysis is performed on multiple windows of data on a per window basis, each window of data comprising data collected during a different window of time; and
the comparing comprises comparing a statistical analysis of a first window to statistical analysis of a second window.

15. The computing component of claim 12, wherein the one or more instructions further cause the hardware processor to:
establish a baseline value for a parameter of the one or more elements that is based on a group elements sharing a common attribute, wherein the statistical analysis compares an average value of the parameters of the one or more element to the baseline value.

16. The computing component of claim 12, wherein the time window comprises an amount of time between an insertion of the element of the data store table and a deletion of the element of the data store table.

17. A computing component comprising:
a hardware processor; and
non-transitory memory storing one or more instructions, which when carried out by the hardware processor cause the hardware processor to:
based on a change in a data path, determine a number of changes to one or more elements of historical data store data over a time window, the historical data store data comprising times of data store events and types of data store events, the data store events comprising types of changes occurring in a data store table that result from changes in network information, wherein the types of changes comprises one or more of: a row deletion in the data store table responsive to an inactive data path and a row insertion responsive to an available data path;
computing current information associated with the change in connections between network devices based on the number of changes to the one or more elements;
perform, by the computing component, an analysis comprising comparing the current information to a defined criterion associated with the change in the data path;

detect, by the computing component, an anomaly within the current information, based on the analysis; and send, by the computing component, an alert indicating detection of the anomaly.

18. The computing component of claim 17, wherein the comparing comprises:

computing a deviation of the current information from prior information associated with the change in the data path; and determining if the deviation is more than a threshold value.

19. The computing component of claim 18, wherein the one or more instructions further cause the hardware processor to:

adjust the threshold value through a user interface.

20. The computing component of claim 17, wherein the changes occurring in the data store table comprises changes to a list of elements.

* * * * *